(12) United States Patent
Cooper

(10) Patent No.: US 10,481,375 B2
(45) Date of Patent: Nov. 19, 2019

(54) SELECTIVE PLANE ILLUMINATION MICROSCOPY INSTRUMENTS

(71) Applicant: GE Healthcare Bio-Sciences Corp., Piscataway, NJ (US)

(72) Inventor: Jeremy R. Cooper, Issaquah, WA (US)

(73) Assignee: GE Healthcare Bio-Sciences Corp., Piscataway, NJ (US)

( * ) Notice: Subject to any disclaimer, the term of this patent is extended or adjusted under 35 U.S.C. 154(b) by 77 days.

(21) Appl. No.: 15/536,490

(22) PCT Filed: Dec. 8, 2015

(86) PCT No.: PCT/US2015/064512
§ 371 (c)(1),
(2) Date: Jun. 15, 2017

(87) PCT Pub. No.: WO2016/105934
PCT Pub. Date: Jun. 30, 2016

(65) Prior Publication Data
US 2017/0371140 A1 Dec. 28, 2017

Related U.S. Application Data

(60) Provisional application No. 62/109,245, filed on Jan. 29, 2015, provisional application No. 62/095,959, filed on Dec. 23, 2014.

(51) Int. Cl.
*G02B 21/02* (2006.01)
*G02B 21/16* (2006.01)
(Continued)

(52) U.S. Cl.
CPC ....... *G02B 21/086* (2013.01); *G02B 21/0088* (2013.01); *G02B 21/02* (2013.01);
(Continued)

(58) Field of Classification Search
None
See application file for complete search history.

(56) References Cited

U.S. PATENT DOCUMENTS 3,798,449 A 3/1974 Reinheimer et al.
5,570,228 A 10/1996 Greenberg et al.
(Continued)

FOREIGN PATENT DOCUMENTS

DE 10 2012 110077 A1 6/2014

OTHER PUBLICATIONS

International Search Report and Written Opinion for corresponding PCT application No. PCT/US2015/064512 dated Feb. 23, 2016; 10 pages.
(Continued)

*Primary Examiner* — Derek S. Chapel
(74) *Attorney, Agent, or Firm* — Eversheds Sutherland (US) LLP

(57) ABSTRACT

Disclosed is an optical arrangement providing selective plane illumination, including an inverted illumination objective mounted below a sample support in use providing a line or plane of light at the sample support, and at least one image collection objective mounted above the support, said inverted illumination objective having an illumination objective optic axis, and said image collection objective having an image collection objective optical axis, wherein illumination light is arranged to propagate toward the illumination objective lateral offset to the illumination objective optical axis such that the illumination light leaving the illumination objective propagates toward the sample support at an oblique angle relative to the illumination objective optical axis, and wherein the image objective optical axis
(Continued)

has an angle α which is obtuse to the illumination objective optical axis and generally perpendicular to light propagating at the sample support.

13 Claims, 4 Drawing Sheets

(51) Int. Cl.
- *G02B 21/18* (2006.01)
- *G02B 21/08* (2006.01)
- *G02B 21/00* (2006.01)
- *G02B 21/36* (2006.01)

(52) U.S. Cl.
CPC ............ *G02B 21/367* (2013.01); *G02B 21/16* (2013.01); *G02B 21/18* (2013.01)

(56) References Cited

U.S. PATENT DOCUMENTS

| | | | |
|---|---|---|---|
| 5,774,224 A * | 6/1998 | Kerstens | G01B 9/04 356/394 |
| 7,777,200 B2 | 8/2010 | Erlbacher et al. | |
| 8,472,113 B2 * | 6/2013 | Knebel | G02B 21/0032 359/385 |
| 9,104,020 B2 | 8/2015 | Knebel et al. | |
| 9,829,691 B2 * | 11/2017 | Otte | G02B 21/0032 |
| 2011/0115895 A1 * | 5/2011 | Huisken | G02B 21/0048 348/79 |
| 2012/0098949 A1 | 4/2012 | Knebel et al. | |
| 2012/0307037 A1 * | 12/2012 | Holy | G02B 21/08 348/79 |
| 2013/0162801 A1 | 6/2013 | Kajiyama et al. | |
| 2013/0335818 A1 * | 12/2013 | Knebel | G01N 21/6458 359/385 |
| 2014/0126046 A1 * | 5/2014 | Shroff | G02B 21/0004 359/385 |
| 2017/0336610 A1 * | 11/2017 | Shroff | G02B 21/16 |

OTHER PUBLICATIONS

Extended European Search Report and Opinion issued in connection with corresponding EP Application No. 15874101.7 dated Jul. 2, 2018.

Chinese Office Action for CN Application No. 201580070405.5 dated Mar. 19, 2019 (9 pages, English translation).

* cited by examiner

SELECTIVE PLANE ILLUMINATION MICROSCOPY INSTRUMENTS

CROSS-REFERENCE TO RELATED APPLICATIONS

This is a national stage application under 35 U.S.C. § 371(c) of PCT Application No. PCT/US2015/064512, filed on Dec. 8, 2015, which claims priority to U.S. Provisional Application No. 62/109,245 filed on Jan. 29, 2015, which claims priority to U.S. Provisional Application No. 62/095,959 filed on Dec. 23, 2014, the disclosures of which are incorporated herein by reference in their entireties.

FIELD OF THE INVENTION

The present invention relates to selective plane illumination microscopy (SPIM) and particularly, but not exclusively to microscopy instruments adaptable to employ more than one microscopy technique including SPIM.

BACKGROUND OF THE INVENTION

SPIM is a fluorescence microscopy imaging technique that enables extended imaging of live dynamic samples due to significant reduction in phototoxicity and photo-bleaching compared to more conventional microscopy techniques. SPIM employs lines or planes of excitation illumination (often called light sheets), for example generated by a cylindrical lens, and perpendicular detection geometry to allow optically sectioned examination of samples. In addition, SPIM illumination generates a reduced out of focus background signal which greatly enhances the image quality of three-dimensional specimens. An example of SPIM is shown in U.S. Pat. No. 7,554,725.

In most implementations of SPIM, the SPIM system is designed around the specimen, thereby requiring novel sample preparation, such as embedding the sample in an agarose gel, which precludes the use of conventional sample mounts, such as glass cover slips, that are used with many conventional microscopes. Although other types of microscopy, such as oblique plane microscopy (OPM) use the same objective to illuminate as well as detect the specimen and can accommodate the above novel sample preparation, such a microscopy system suffers from a low numerical aperture relative to other methodologies, and therefore requires extensive optics to correct aberrations that result from the light sheet being tilted relative to the detection plane of the microscope. Consequently, it would be desirable to be able to easily convert an existing conventional microscope to accommodate SPIM. Such a conversion is shown in WO2012122027.

A detrimental feature of previous instruments that utilize SPIM, including the conversion shown in WO2012122027 is the unconventional positioning of objectives that leads to two key disadvantages. First, sample preparation, sample loading, and sample unloading is cumbersome and challenging. Previous attempts have not been amenable to adapting conventional instruments to maintain the imaging functionality of other powerful microscopy imaging modes, including, but not limited to, SIM (structured illumination microscopy) and TIRF (Total Internal Reflection Fluorescence Microscopy). One way to do this is to rearrange the optic axes of the illumination and imaging objectives. One attempt at such a rearrangement is shown in U.S. Pat. No. 8,472,113. However, the arrangements shown in U.S. Pat. No. 8,472,113 and WO2012122027 use illumination from above, which hinders sample loading and unloading because handling space is consequently very confined.

SUMMARY OF THE INVENTION

According to a first aspect, the invention provides an optical arrangement providing selective plane illumination, including an inverted illumination objective mounted below a sample support in use providing a line or plane of light at the sample support, and at least one image collection objective mounted above the support, said inverted illumination objective having an illumination objective optical axis, and said image collection objective having an image collection objective optical axis, wherein illumination light is arranged to propagate toward the illumination objective laterally offset to the illumination objective optical axis such that the illumination light leaving the illumination objective propagates toward the sample support at an oblique angle relative to the illumination objective optical axis, and wherein the image objective optical axis has an angle $\alpha$ which is obtuse to the illumination objective optical axis and generally perpendicular to light propagating at the sample support.

Thus the optical arrangement is such that illumination is from below, which allows convenient adaptation of other high resolution microscopy instruments. A key advancement of embodiments described herein is the provision for SPIM using a conventional oil or water immersion objective positioned in an inverted configuration which is readily adaptable to additional fluorescence microscopy imaging modes. Also, the imaging optics can be lifted out of the way, for convenient sample preparation, or easier prepared sample loading/unloading.

In a refinement, a pair of imaging objectives can be employed, one on each side of the illumination objective optical axis, to provide isotropic high-resolution imaging throughout the volume of a three-dimensional sample.

According to a second aspect, the invention provides a SPIM microscopy instrument including a illumination objective having an illumination objective optical axis, and including a sample support moveable relative to said axis in a direction perpendicular to the illumination objective optical axis, and preferably so moveable in a continuous motion.

The invention provides a method of illuminating a sample using the optical arrangement as described in the first or second aspect above and a microscopy instrument that includes the optical arrangement as described in the first or second aspect above. The invention also provides a SPIM instrument that includes the optical arrangement as described in the first or second aspect above.

The invention extends to any combination of features disclosed herein, whether or not such a combination is mentioned explicitly herein. Further, where two or more features are mentioned in combination, it is intended that such features may be claimed separately without extending the scope of the invention.

BRIEF DESCRIPTION OF THE DRAWINGS

The invention can be put into effect in numerous ways, illustrative embodiments of which are described below with reference to the drawings, wherein:

FIG. 1a shows a schematic representation of an optical arrangement for SPIM;

FIG. 1b shows a microscopy instrument employing the optical arrangement of FIG. 1a;

FIG. 2 shows a first light beam path model for the optical arrangement shown in FIG. 1a;

FIG. 3 shows a second light beam path model for the optical arrangement shown in FIG. 1a.

DETAILED DESCRIPTION OF THE INVENTION

Figure 1:
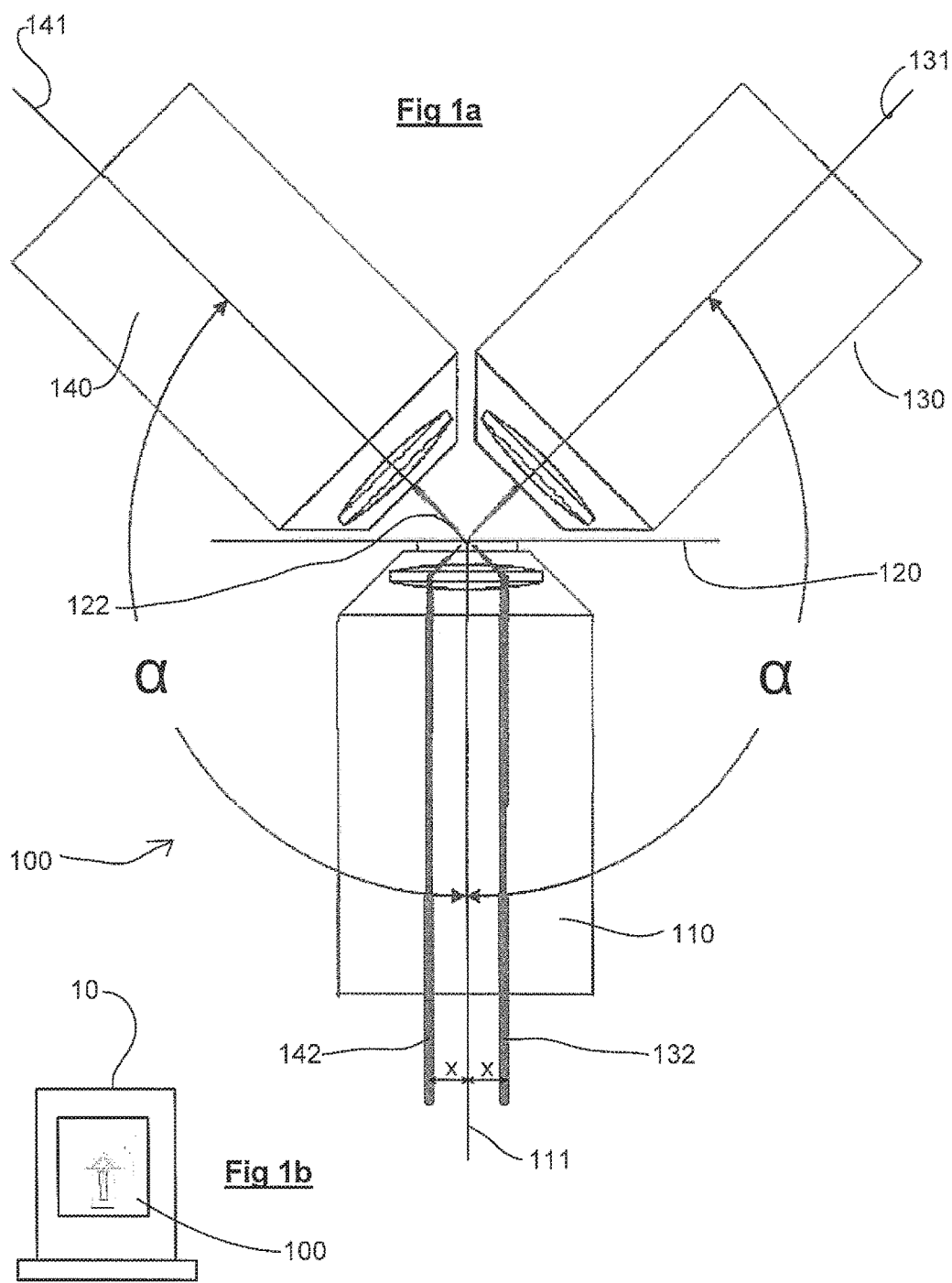

The invention, together with its objects and the advantages thereof, may be understood better by reference to the following description taken in conjunction with the accompanying drawings, in which like reference numerals identify like elements in the Figures.

Referring to FIG. 1a, an optical arrangement 100 is shown schematically in cross section, and a SPIM instrument 10 is shown in FIG. 1b incorporating the optical arrangement of FIG. 1a. A SPIM illumination objective lens 110 is illustrated which provides a line, or a plane/sheet of light (herein referred to as a line), the line extending in a direction perpendicular to, and into, the paper. The illumination objective lens 110, is positioned below a sample support 120, in an inverted configuration, so as to be compatible with the typical configuration of high-resolution and super-resolution fluorescence microscopes. The illumination objective lens 110 has an illumination objective optical axis 111. Two separate image collection objective lenses 130 and 140 are positioned above the sample support 120, each having an image collection objective optical axis 131 and 141 respectively. The angle α between the illumination objective optical axis and each of the image collection objective optical axes 131 and 141 is about 135 degrees. Thus the optical axes 131 and 141 of the image collection objectives are at +135 degrees and −135 degrees with respect to the optical axis 111 of the inverted illumination objective lens.

In use, coherent laser light beams 132 and 142 in the form of lines of light are alternately directed toward the illumination objective lens 110. Each beam is parallel but laterally offset to the optical axis 111 by a distance x, such that each beam is refracted at the objective lens 110 to propagate obliquely with respect to the optical axis 111 at a sample holding area 122 of the sample support 120.

A sample S can be illuminated by the oblique phase of the beams 132 and 142 at the sample area 122. The lines of illumination are used to selectively illuminate sections through the sample and diffuse image light is collected by the respective image collection objectives 130 and 140 mounted to be generally perpendicular to the direction of propagation of the lines of light of the beams 132 and 142, such that the lines of light stay generally at the focal plane of the image collection objectives.

The purpose of the dual image collection objectives 130 and 140 is to provide isotropic high-resolution imaging throughout the volume of a three dimensional sample. A structured image can be formulated from a series of images from both left and right illuminations.

The optical arrangement described above provides a thin line of illumination that propagates upwards through the inverted objective lens 110, but at a slight lateral offset x with respect to the lens' optical axis 111 such that the beam exiting the lens is precisely diverted to the angle of the focal plane of the image collection objectives 130 or 140. That is, orthogonal to the optic axis 131 and 141 of the image collection objectives. In this manner, only the thin section of the sample that is in focus with respect to the imaging lens is excited by the illumination beam 132 or 142. In order to provide illumination for both of the image collection objective lenses 130 and 140, the aforementioned lateral offset x of the illumination beams would be alternated between two discrete lateral offset positions lying on equal and opposite sides of the optical axis 111 of the inverted illumination objective lens 110. Switching of the beam between the two discrete lateral offset positions can be accomplished by a variety of light manipulators such as opto-mechanical switching mechanisms, including but not limited to a galvo-mirror, a piezo-mirror, or a flipper mirror. Likewise, scanning of the beam across the entire field of view of the sample plane can be accomplished by a variety of opto-mechanical scanning mechanisms, including but not limited to a galvo-mirror, a piezo-mirror, or a rotating polyhedral mirror. Switching between illumination modes (SPIM, SIM, TIRF, PK, etc., . . . ) can be accomplished by utilizing multiple reflections off of a galvo-mirror with an associated beam detour path for each supported mode, for example as previously described in WO2013074033A1, the contents of which are incorporated herein by reference.

Figure 2:
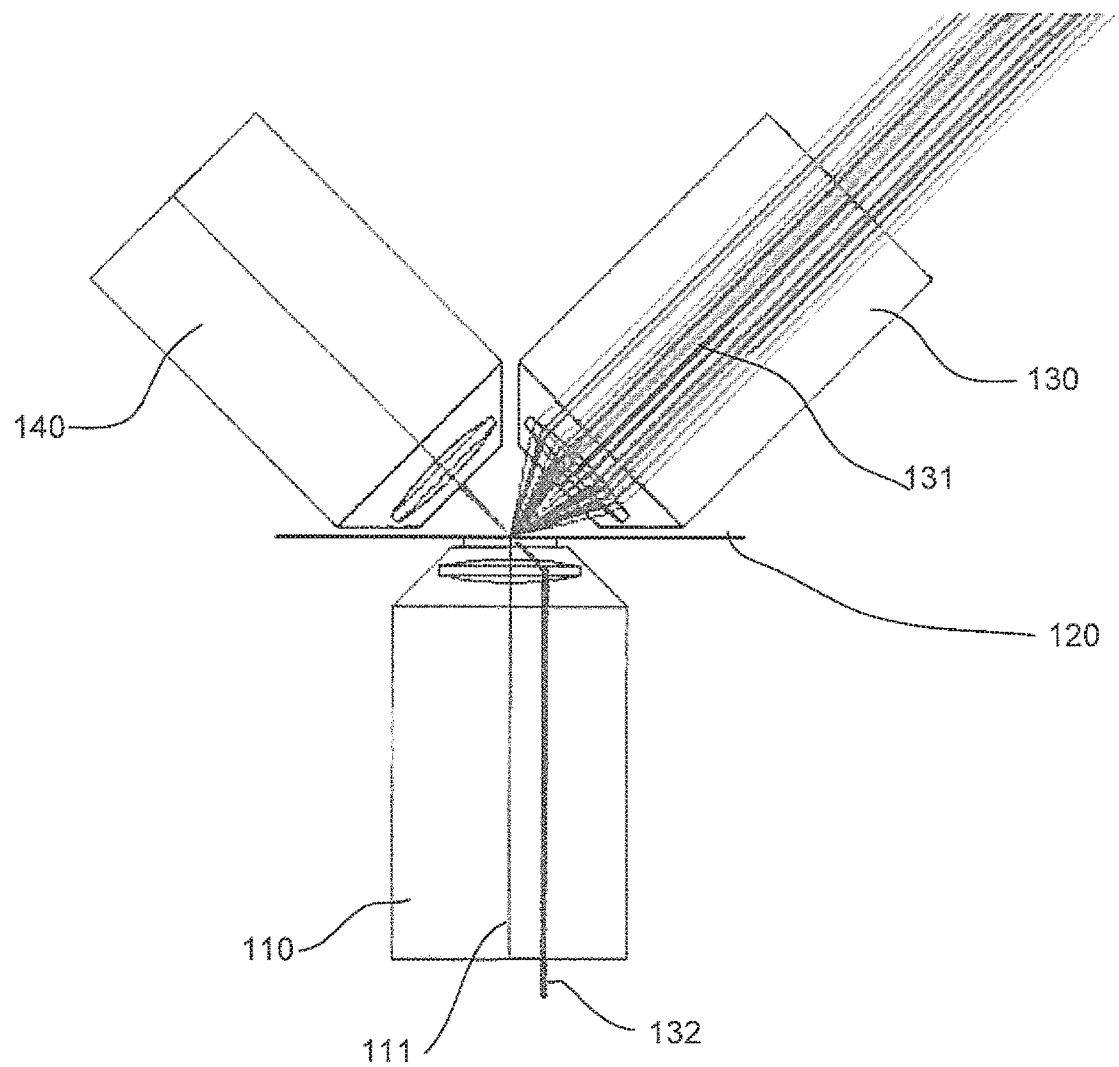
Figure 3:
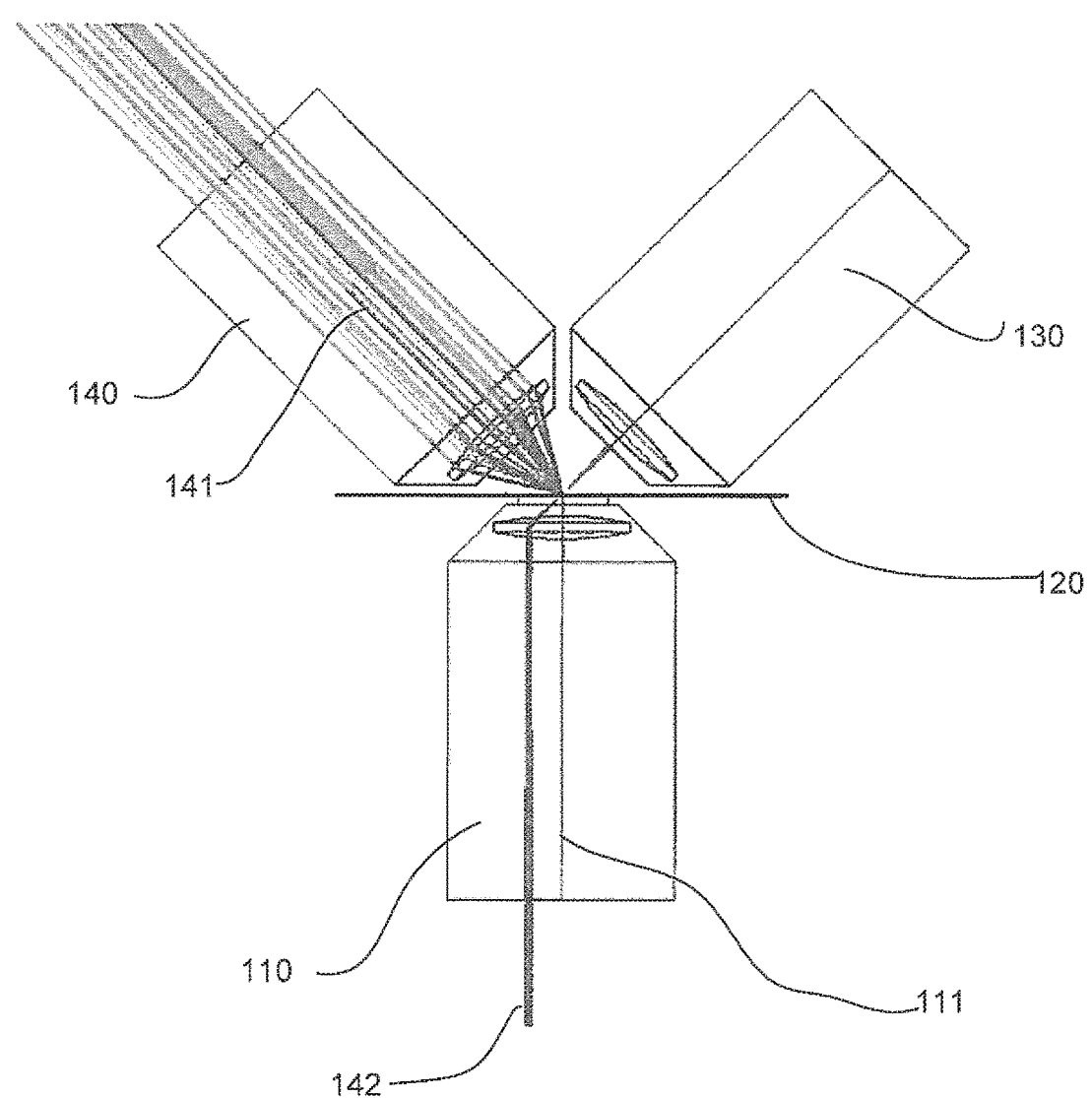

FIGS. 2 and 3 show beam path models for the two illumination beam paths 132 and 142, and in particular illustrate that the image collection objectives collect light propagating from the sample area 122 generally perpendicular to the illumination path.

Figure 4:
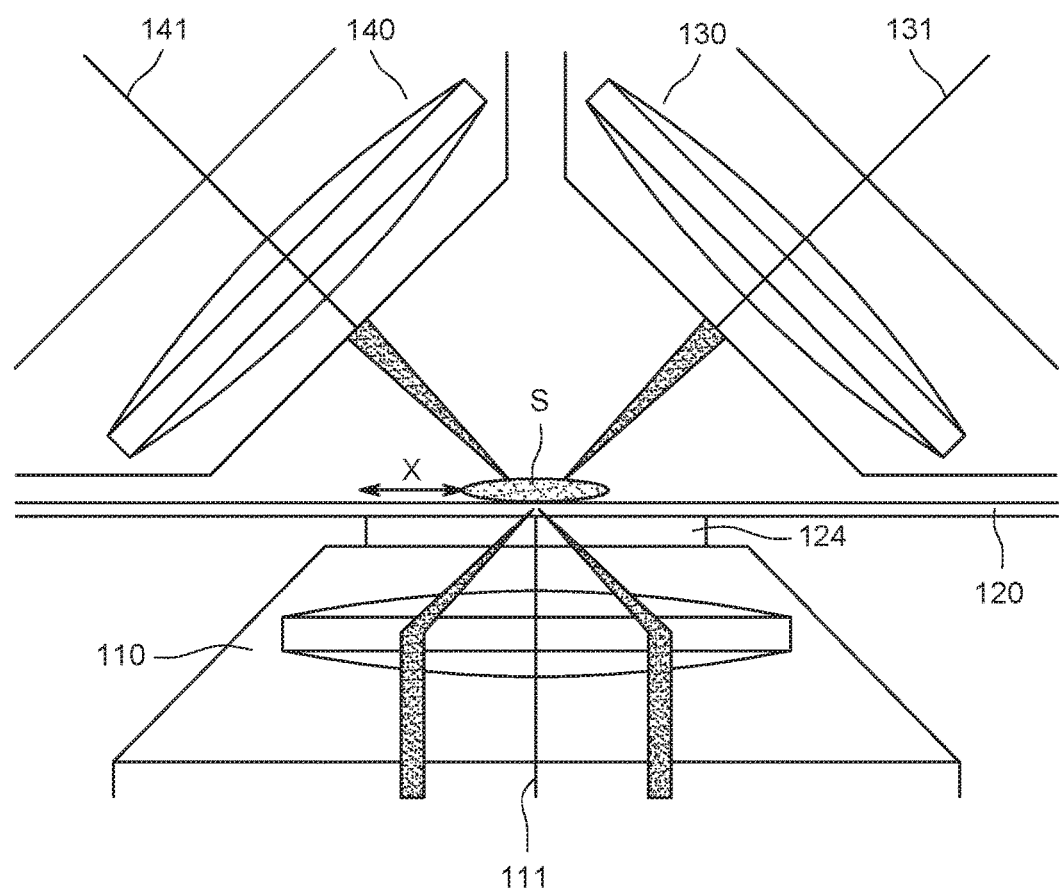
FIG. 4 shows a schematic representation employing a moving sample support.

FIG. 4 shows the optical arrangement in more detail and illustrates more clearly a second aspect of the invention. In this embodiment the sample support 120 is moveable in the X plane defined by the optical axes of the 3 objective lenses 110, 130 and 140. This movement provides a method for sectioning through a three-dimensional sample volume without the requirement for scanning the illumination beam across multiple adjacent image planes. The technique involves movement of the sample support 120, which is preferably by means of a linear slideway, or two orthogonally opposed slideways and an electric motor drive or drives. Scanning is done horizontally by moving the sample. Ideally, the scanning would be continuous rather than in discrete steps in order to minimize vibration of the sample media which would be sensitive to discrete lateral perturbations. This approach has three distinct advantages. First it reduces the number of scanning control mechanisms for the illumination beam. Second, it eliminates the need to provide opto-mechanical depth control of the image collection objectives while scanning. These first two advantages greatly simplify the opto-mechanical system design while also improving system stability and alignability. The third advantage is a functional one, in which the proposed horizontal scanning of the sample allows for an unlimited field of view along one lateral axis to accommodate elongated specimens, such as *caenorhabditis elegans*. To make this SPIM optical arrangement compatible with other known high resolution microscopy techniques, the space between the sample support 120 and the illumination objective 110 is bridged by fluid, in this case immersion oil 124.

Although two embodiments have been described and illustrated, it will be apparent to the skilled addressee that additions, omissions and modifications are possible to those embodiments without departing from the scope of the invention claimed. For example, the angle α between the optical axes 111 and 131, or the axes 111 and 141 could in principle be anywhere in the range between about 100 degrees and about 170 degrees, however 135 degrees supports the greatest light gathering capacity and is thus considered optimal and 125 to 145 degrees is satisfactory.

The invention claimed is:

1. An optical arrangement providing selective plane illumination, comprising an inverted illumination objective mounted below a sample support and arranged to provide a line or plane of light propagating at the sample support, and at least one image collection objective mounted above the sample support, the inverted illumination objective having an illumination objective optical axis, and the image collection objective having an image collection objective optical axis, wherein the illumination light is arranged to propagate the illumination objective laterally offset to the illumination objective optical axis such that the illumination light leaving the illumination objective propagates toward the sample support at an oblique angle relative to the illumination objective optical axis, and wherein the image collection objective optical axis has an angle $-\alpha$ which is obtuse to the illumination objective optical axis and generally perpendicular to light propagating at the sample support, wherein the at least one image collection objective comprises first and second image collection objectives each mounted on opposing sides of the illumination objective optical axis and wherein, the illumination light is arranged to propagate on alternate opposing sides of the illumination objective optical axis along respective first and second paths, to provide the light propagating at the sample support to the first or the second image collection objective alternately.

2. The optical arrangement of claim 1, wherein the angle $\alpha$ is between 100 and 170 degrees.

3. The optical arrangement of claim 1, wherein the optical arrangement further comprises an optical manipulators to provide the illumination light in the form of a line, a plane or a sheet of a collimated light.

4. A method of illuminating a sample to provide selective plane illumination microscopy (SPIM), the method comprising:

providing the optical arrangement of claim 1;
causing the illumination light to propagate on alternate opposing sides of the illumination objective optical axis along respective first and second paths;
providing the light propagating at the sample support to the first or the second image collection objective alternately;
capturing one or more images collected by the first and second image collection objectives; and
formulating a structured image from the images captured by both image collection objectives.

5. A selective plane illumination microscopy (SPIM) instrument comprising the optical arrangement of claim 1.

6. The instrument of claim 5, adaptable to perform also one or both of structured illumination microscopy (SIM) and total internal reflection fluorescence (TIRF) microscopy techniques.

7. The instrument of claim 5, wherein there is a space between the illumination objective and the sample support, and the space is bridged by a liquid.

8. The instrument of claim 5, wherein the sample support is moveable in a direction perpendicular to the illumination objective optical axis.

9. The instrument of claim 8, wherein the sample support is moveable in the direction perpendicular to the illumination objective optical axis in a continuous motion.

10. The optical arrangement of claim 1, wherein the angle $\alpha$ is between 125 and 145 degrees.

11. The optical arrangement of claim 1, wherein the angle $\alpha$ is 135 degree.

12. The optical arrangement of claim 1, wherein the illumination light is a coherent light.

13. The optical arrangement of claim 1, wherein the illumination light is a laser light.

* * * * *